United States Patent [19]

Roma

[11] 3,791,609

[45] Feb. 12, 1974

[54] ADAPTER FOR INCREASING THE CAPACITY OF TAPE RECORDERS

[75] Inventor: Peter Roma, New York, N.Y.

[73] Assignee: Video Circuits, Inc., Elmsford, N.Y.

[22] Filed: Aug. 16, 1971

[21] Appl. No.: 171,853

[52] U.S. Cl. .................................. 242/201, 242/210

[51] Int. Cl. .......................................... G11b 15/32

[58] Field of Search.. 242/210, 201, 202, 193, 68.3, 242/54.1, 204, 206, 209, 205; 352/29

[56] References Cited

UNITED STATES PATENTS

| | | | |
|---|---|---|---|
| 2,773,416 | 12/1956 | Kleinerman | 352/29 |
| 2,968,991 | 1/1961 | Wagman et al. | 242/205 X |
| 2,969,201 | 1/1961 | Bodholdt | 242/193 |
| 2,768,795 | 10/1956 | Norton | 242/201 |
| 2,503,734 | 4/1950 | Hendel | 242/68.3 |
| 2,725,200 | 11/1955 | Ward | 242/202 |
| 2,652,204 | 9/1953 | Haynes | 242/54.1 |

*Primary Examiner*—George F. Mautz
*Attorney, Agent, or Firm*—Paul S. Martin

[57] ABSTRACT

An adapter is secured to the case of a tape recorder, its drive being coupled coaxially to the tape-reel drive means of the tape recorder. Separate drive shafts projecting from a plate of the adapter carry larger capacity reels than the tape recorder is designed for, increasing the capacity of the tape recorder.

10 Claims, 8 Drawing Figures

ADAPTER FOR INCREASING THE CAPACITY OF TAPE RECORDERS

BACKGROUND OF THE INVENTION

In the use of tape recorders for either audio and/video applications, the tape recorders are often designed to carry a limited size of reel upon which a limited length of tape is wound. Thus, in practice, a tape recorder may often be designed to carry reels no greater than 5 inches in diameter. Such 5-inch reels then limit the recording time, depending upon the speed of the tape passing the recording head. When recording a continuous lengthy program, therefore, it is often then necessary to interrupt the recording in order to exchange reels, so that the reel with a part of the recorded program is replaced with a fresh reel for subsequent recording. When thus performing such exchange of recording reels, some of the program will not be recorded, if the program cannot be stopped at the same time that the reels are being exchanged. Consequently, when using low-capacity reels, it is often necessary to incur a loss of recorded matter during the period or interval when the reels are being interchanged to allow for further recording. Accordingly, it is desirable to provide for an arrangement through which the standard or usual recorder may have its capacity increased so that there is no need to interchange reels with the accompanying loss of recording matter.

SUMMARY OF THE INVENTION

It is an object of the present invention to provide an arrangement for increasing the recording time and recording capacity of conventional tape recorders.

It is also an object of the present invention to provide an arrangement for extending the capacity of conventional recorders through the use of an adapter which may be easily fitted onto the conventional tape recorders.

It is a still further object of the present invention to provide an adapter arrangement for extending the recording time of tape recorders, which may be economically fabricated and is reliable in operation.

The objects of the present invention are accomplished through an arrangement which consists of an adapter plate which is fitted over the shafts of the tape recorder that drive the reels upon which the tape is wound. Bushings on the adapter plate tightly grip the drive shaft of the tape recorder, and these bushings are linked through belts to a separate set of drive shafts held by the adapter plate. These separate drive shafts on the adapter plate are spaced so as to accomodate larger sized reels upon which a greater length of recording tape is wound. The adapter is held in place by securing it to the case of the recorder and through its own supporting structure. Optionally, an auxiliary motorized arrangement is used to aid in rotating the drive shafts so as to overcome the larger resisting forces resulting from the use of larger reels than those for which the conventional recorder is designed.

Various further and more specific purposes, features and advantages will clearly appear from the detailed description given below, taken in connection with the accompanying drawing which forms part of this specification and illustrates merely by way of examples, embodiments of the device of the invention.

BRIEF DESCRIPTION OF THE DRAWING

In the following description and in the claims, parts will be identified by specific names for convenience, but such names are intended to be as generic in their application to similar parts as the art will permit. Like reference characters denote like parts in the several figures of the drawings, in which

DESCRIPTION OF THE PREFERRED EMBODIMENTS

Figure 1:
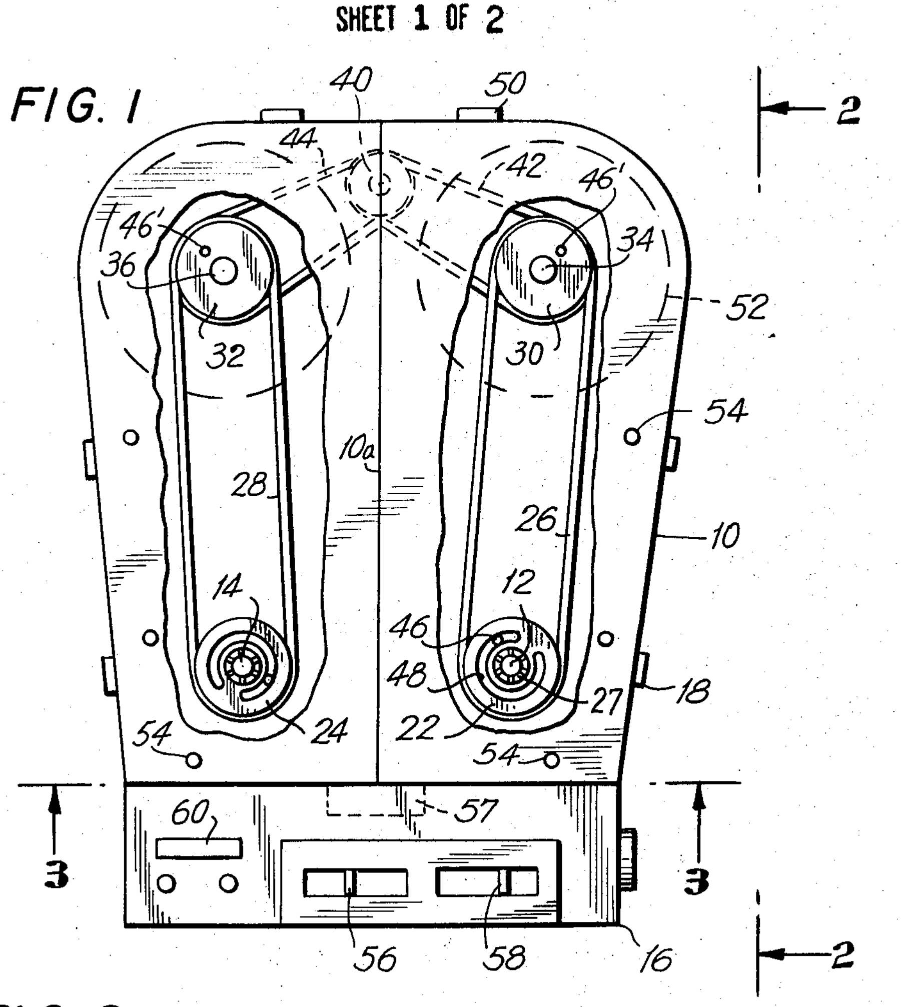
FIG. 1 is a plan view of an illustrative adapter, in accordance with the present invention when assembled to a conventional video tape recorder for extending the recording time of such conventional units.
Figure 2:
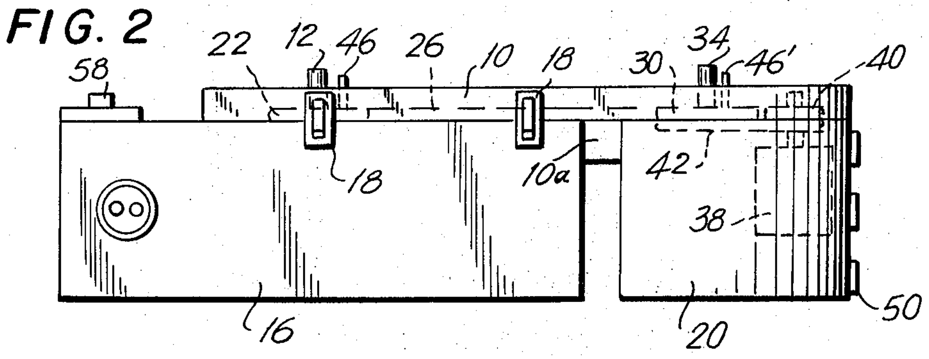
FIG. 2 is a side elevation viewed from line 2—2 in FIG. 1 and shows the assembly of adapter and conventional video tape recorder.
Figure 3:
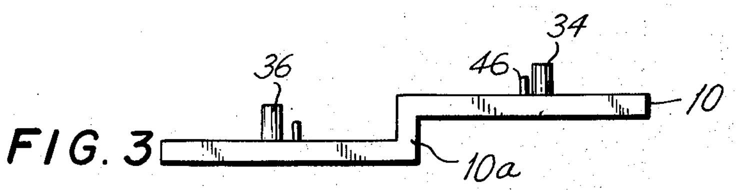
FIG. 3 is an end view of the adapter as viewed from line 3—3 in FIG. 1 omitting box 20.

Referring to the drawing and, in particular, to FIG. 1, the adapter plate 10 is mounted in place by slipping it over the drive shafts 12 and 14 of a conventional video tape recorder 16. Secure fixing of the adapter plate 10 to the tape recorder 16 is aided through clip-on locks or latches 18 mounted on the sides of the recorder 16. These locks or latches 18 are similar to the types used for locking the cover of the tape recorder in place with the main body of the recorder. These clip-on locks or latches 18 can be operated, for example, by the use of simply one or two fingers, as is the case in the conventional types of these devices. At the same time, any suitable locks or latches which are simply operated and are generally used for purposes of closing suitcases, cabinets, or carrying bags, would be applicable for this purpose. Such clip-on locks or latches are well known in the arts and are, for this reason, not further described.

In addition to the locks or latches 18, the adapter plate 10 is also supported in place through a box-shaped unit 20 secured to the plate 10. Thus, should the recorder be placed on a table surface, for example, the unit 20 also rests on the surface of the table, and serves as additional support for the plate 10 so that it is firmly secured and held in place relative to the tape recorder 16.

The adapter arrangement, in accordance with the present invention may be used for either audio recorders or video recorders. When using video recorders, the adapter plate 10 has a step 10*a* for accommodating slant track recording.

Figure 4:
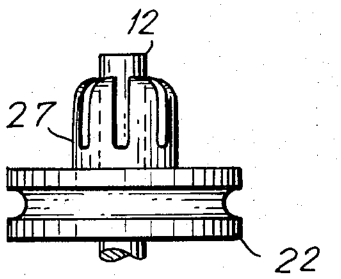
FIG. 4 is a front view of a pulley and bushing of the adapter assembled to the drive shaft of a conventional tape recorder.
Figure 5:
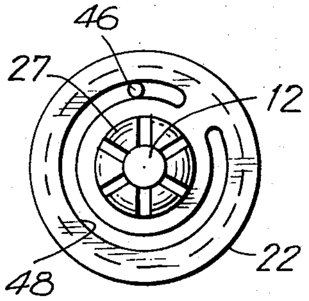
FIG. 5 is a plan view of the assembly of FIG. 4.

The adapter plate 10 serves as the bearing support for a pair of rotatable pulleys 22 and 24. These two pulleys slip freely over the drive shafts 12 and 14. Fixedly secured to these pulleys 22 and 24, are split spring-type bushings 27. When the plate 10 is slipped on to the recorder 16, and the pulleys 22 and 24 are thereby passed over the shafts 12 and 14, the bushings 27 secured to these pulleys firmly grip the shafts 12 and 14 through their spring sections. Thus, the bushing 27 (FIG. 4) is sub-divided into a series of resilient sections which are capable of expanding when the plate 10 with the assembled pulleys thereon is forced onto the recorder with the drive shafts 12 and 14 being passed through the interior of bushings 27. The bushing 27 is of the split design whereby the resilient sections resulting from the split design are formed so that when in their unstressed position, the internal diameter of the bushing with its surrounding sections, is somewhat smaller than the exterior diameters of the driving shafts 12 and 14. When once the bushing is seated over the respective shafts 12 and 14, the resilient sections of the bushing are under spring tension or stress and thereby grip firmly against the drive shafts 12 and 14.

Connected with each pulley 22 and 24, is a belt 26 and 28, respectively, as best shown in FIG. 1. These belts link the pulleys 22 and 24 with two further pulleys 30 and 32, respectively, mounted on the adapter plate 10 is spaced relation from each other. The pulleys 30 and 32 are constructed so that their rims are shaped to receive the belts 26 and 28. The pulleys 30 and 32 are held by the plate 10 through shafts passing through the pulley and projecting through the top surface of the plate. The pulley may be mounted on the underside of the plate so that the pulleys 22 and 24 are also mounted on the underside of the plate and thereby the drive including the belts is not visible from the exterior when the adapter plate is mounted in place on the recorder 16. At the same time, these pulleys 22,24, 30,32 may also be mounted on the top surface of the plate 10, in which case the drives interconnecting these pulleys are visible to the user. The adapter plate may also be designed in the form of an assembly of a lower plate section and an upper plate section, and the pulleys together with their belt drives may be held between these two sections of the plate. In this manner, the pulley drives are sandwiched between the plate sections, and are protected from mishandling on either the upper or lower surface of the plate 10.

Directly rotatable with the pulleys 30 and 32 are shafts 34 and 36 projecting above the top surface of the plate 10. Thus, the shafts 34 and 36 are fixed through their respective pulleys. By using pulleys all of the same diameter, therefore, the rotational speed of the pulleys 30 and 32 correspond precisely to those of pulleys 22 and 24, and the shafts 34 and 36 rotate with the same speed as shafts 12 and 14, respectively. The shafts 34 and 36 serve as the drive shafts for reels which are larger in size than the reels that the user can slip onto shafts 12 and 14 of the tape recorder. Thus, if the tape recorder unit 16 is designed to hold recording reels which are five inches in diameter, then the shafts 34 and 36 will allow the user to mount recording reels which are seven inches in place. Through the use of these 7 inch diameter reels, the recording time capacity of the recorder 16 is increased. To allow for the larger size in diameters of the reels, the shafts 34 and 36 are spaced with a wider distance between them than the distance which prevails between shafts 12 and 14.

Whereas the shafts 34 and 36 are shown located in FIG. 1 toward the rear of the recorder 16, it is not essential that the driving shafts 34 and 36 be mounted in this specific relationship to the recorder. It is also quite possible to mount the shafts 34 and 36 so that they are located on the sides of the recorder. Thus, under such design conditions, the shaft 34 would be located to the right of shaft 12, in FIG. 1, and the shaft 36 would then be located to the left of the shaft 14. Thus, it is possible to locate the shafts 34 and 36 at any convenient location relative to the shafts 12 and 14. In locating the shafts 34 and 36, it is only necessary to keep in mind that they should not be located so close together that mounting of the large reels intended is thereby prevented.

When intending to use the adapter plate 10 in conjunction with a recorder so that the recording time is substantially increased, it is possible that the drive mechanism for the shafts 12 and 14 is insufficient to drive the shafts 34 and 36 carrying the larger diameter reels. Thus, the torque available from the drive system within the recorder 16 may be designed to be capable of handling the torque requirements for 5-inch reels for which the recorder 16 may be designed. When, now, 7-inch reels are placed onto the shafts 34 and 36, for example, it is possible that the driving unit within the recorder 16 will not be able to exert sufficient torque to rotate the shafts 34 and 36 with accurate speed in view of the larger reels being supported by the shafts 34 and 36. Under the circumstances, the present invention provides for an auxiliary drive which is held within the supporting unit 20, and which aids in the rotation of the pulleys 30 and 32 by being linked to these pulleys. This auxiliary drive consists of a motor 38 with a double pulley 40 mounted on its shaft. This double pulley with two rims for accommodating two separate belt drives, is linked to the pulleys 30 and 32 through belts 42 and 44, respectively. The arrangement of the belt drives 42 and 44 is such that slippage is permitted between these belts and their driving and driven pulleys when the linear velocities of these belts 42 and 44 differ from the linear velocities of the belts 26 and 28. Thus, the speeds of the belts 26 and 28 are dominant and determine the rotational speeds of the pulleys 30 and 32 while the auxiliary drive, including the motor 38, serves to aid in the rotation of these pulleys. Should the speed of motor 38, for any reason vary or differ from the speed by which the linear speeds of the belts 42 and 44 differ from the linear speeds of the belts 26 and 28, slippage occurs within the belt drives 42 and 44 so as to be certain that the speeds of the pulleys 30 and 32 correspond to their accurately assigned magnitudes. To accommodate the belts 42 and 44 as well as the belts 26 and 28, the pulleys 30 and 32 are of the double design type similar to that shown for pulley 40. In this manner, each pulley 30 and 32 can accommodate two belts.

For purposes of turning the tape reels, the conventional tape recorder has eccentrically located pins 46 which rotate with the drive shafts. The reels contain eccentrically located holes which pass over the pins 46 when the reels are slipped in place over the respective drive shafts. These pins 46 thereby prevent slippage between the reels and the drive shafts and, accordingly, the reels are rotated precisely with the speed that the drive shafts are rotating. To accommodate these pins 46 in the adaptor 10, the pulleys 22 and 24 include annular slots 48 through which these pins 46 may project.

This annular slot 48 surrounds the drive shaft except for a slight discontinuity. As a result, the pin 46 will generally pass through the slot 48 when the adaptor 10 is mounted in place. Should the pin 46 find interference through the slight discontinuity in the slot, then it is only necessary to rotate somewhat the bushing 26 in order for the pin to pass through the slot. The pulleys 30 and 32 also have such locating pins 46' mounted on them for the purpose of driving the larger reels with the precise assigned speeds.

To facilitate connecting the tape recorder to various accessory equipment, the supporting unit 20 is provided with electrical connectors 50 to which various recording accessories may be connected. The unit 20 serves, thereby, as a connection or junction box by which the circuits of the tape recorder may be interconnected in a variety of different ways to accommodate the requirements of various accessory items designed to operate in conjunction with the conventional recorder 16.

Figures 6, 7:
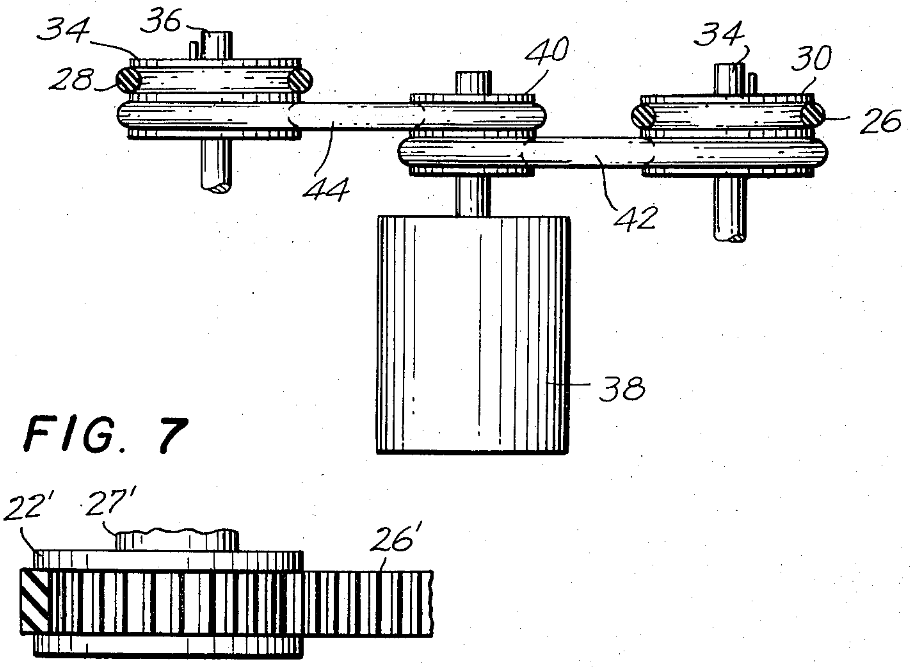
FIG. 6 is an elevational view of portions of the adapter, omitting plate 10, and shows the auxiliary drive in the adapter for accomodating higher resistive forces arising from larger reels used in conjunction with the adapter, in accordance with the present invention.
FIG. 7 is a fragmentary side view and modified shows a chain belt and sprocket drive used for interconnecting the drive and driven pulleys of the adapter
Figure 8:
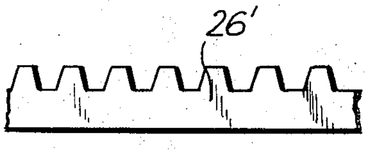
FIG. 8 is a side view and shows a section of the chain belt used in FIG. 7.

The drive belts 26, 28 may be of the design in which teeth are shaped into the belt, so that a modified pulley 22' is used (FIG. 7) and a side view of the belt appears as shown in FIG. 8, which resembles the design of a gear rack. However, it is not necessary that the belt be in this form. The belt 26, 28 may instead also be a Y-shaped belt or a flat belt. The tape speed is preceisely determined by the capstan of the tape recorder and the drive shafts 12, 14 serve substantially as take-up shafts through which the reels are rotated at such a rate that the tape, passed by the capstan, is readily taken up on the reels without excessive slack in the tape. Consequently, precision speeds are not required in the belts 26 and 28, since the pulleys 30 and 32 are also driven only for the purpose of being take-up drives. The same condition applies to the belts 42 and 44 of the auxiliary drive.

In operation of the tape recorder in conjunction with the adapter, in accordance with the present invention, the adapter plate is slipped over the top of the recorder so that the bushings 26 pass over the drive shafts 12 and 14 and the pins 46 pass through the annular slots 48. The adapter is then firmly secured in place through the locks or latches 18. Tape reels 52, generally larger than those for which the tape recorder 16 is designed, are mounted in place by passing them over shafts 34 and 36. Tape from one of the reels 52 is unwound and passed over guide posts 54 so that the tape is brought into operative proximity of the recording head 57. Thereafter, the tape is further passed along several guide posts and then wound upon the take-up reel. The driving capstan for the tape is situated on the path of the tape. After connecting the recorder to a source of power through, for example, a line cord, the recorder may be operated in the conventional manner by operating the controls 56 for stop and start, control 58 for reverse and forward, for example. Level indicator 60 provides an indication of the intensity of the signal which is being recorded.

In constructing the plate member 10 for use of the adapter with a particular recorder, it is possible to mount the spools or pulleys 30 and 32 at an inclined angle with respect to the plane of the pulleys 22 and 24.

While the invention has been described and illustrated with respect to a certain preferred example which gives satisfactory results, it will be understood by those skilled in the art, after understanding the principle of the invention, that various changes and modifications may be made without departing from the spirit and scope of the invention.

What is claimed is:

1. An arrangement for changing the length of recording time of a tape recorder comprising in combination: a plate member separate from said tape recorder but having means for securing same to said tape recorder; first rotatable means held by said plate member and rotatable by the tape reel drive means fo said recorder; second rotatable means spaced from said first rotatable means and held by said plate member; linking means for linking said first rotatable means with said second rotatable means so that said second rotatable means is rotated when said first rotatable means rotates, and auxiliary drive means linked to said second rotatable means for complementing the driving of said second rotatable means by said first rotatable means through said linking means.

2. The arrangement as defined in claim 1, wherein said auxiliary drive means comprises auxiliary motor means; auxiliary pulley means mounted on the shaft of said auxiliary motor means; and auxiliary linking means linking said auxiliary pulley means with said second rotatable means.

3. An adapter for readily separable assembly to a tape recorder to increase the size of tape reels usable with the recorder, where the tape recorder has means for supporting and driving tape reels including a pair of parallel tape-reel shafts projecting therefrom with a given shaft-to-shaft spacing, said adapter including an adapter plate, a first pair of pulleys carried by said plate, the axes of said first pair of pulleys being parallel and being spaced apart for alignment with the tape-reel shafts of the tape recorder, each of said first pair of pulleys having a passage to receive a respective tape-reel shaft of the recorder, each said pulley having drive coupling means operable about the axis thereof and separably cooperable with the tape-reel driving means of the tape recorder, a second pair of pulleys rotatably carried by said adapter plate with axes spaced apart wider than the spacing between the axes of said first pair of pulleys, said second pair of pulleys having shafts and drive coupling means for supporting and driving a pair of tape reels, and a pair of drive belts, each of said drive belts providing drive coupling from a respective one of said first pair of pulleys to a respective one of said second pair of pulleys.

4. An adapter for use with a tape recorder in accordance with claim 3, wherein said drive coupling means of each of said pulleys is part of a pin-and-groove drive coupling that mates with a drive coupling part of the tape reel drive means of the tape recorder, said drive coupling means being oriented for establishing pin-and-groove drive engagement incidental to the assembly of said first pair of pulleys to the tape-reel shafts.

5. The arrangement as defined in claim 3 wherein said means for securing said plate member to said tape recorder comprises manual finger-operated latching means.

6. An adapter as defined in claim 3 for use with a tape recorder having driven tape reel shafts which serve as drive shafts for the adapter, wherein said drive coupling means includes a bushing unitary with each of said first pair of pulleys adapted to grip a respective tape reel shaft of said recorder.

7. An adapter as defined in claim 6, wherein said bushing of each of said first pair of pulleys comprises plural resilient sections adapted to grip a corresponding one of the tape reel shafts of the recorder.

8. The adapter as defined in claim 3 for use with a tape recorder having drive pins located eccentrically with respect to said tape reel shafts and operable by the tape recorder concentrically about those shafts, wherein said drive coupling means is formed to include an opening in each of said first pair of pulleys to receive a respective one of the drive pins of the tape recorder.

9. An adapter in accordance with claim 3, wherein said adapter plate includes an upper plate section and a lower plate section, said pulleys and said drive belts being contained between said sections and being protected thereby from mishandling.

10. An adapter in accordance with claim 3, wherein said adapter plate is divided by a step into two portions at different levels, each of said two portions bearing one of said first pair of pulleys, one of said second pair of pulleys and one of said belts, for accommodating slant-track recording in the tape recorder.

* * * * *